United States Patent
Granger et al.

(10) Patent No.: US 7,111,049 B1
(45) Date of Patent: Sep. 19, 2006

(54) SYSTEM AND METHOD FOR PROVIDING INTERNET BASED PHONE CONFERENCES USING MULTIPLE CODECS

(76) Inventors: Kyle Granger, 391 29th St., San Francisco, CA (US) 94131; Edward A. Lerner, 2833 Union St., San Francisco, CA (US) 94123; James E. G. Morris, 1136 Lincoln Ct., San Jose, CA (US) 95125; Jonathan B. Blossom, 87 Caselli Ave., San Francisco, CA (US) 94114; Martin Hunt, 2014 12th Ct. NE., Issaquah, WA (US) 98029

( * ) Notice: Subject to any disclaimer, the term of this patent is extended or adjusted under 35 U.S.C. 154(b) by 966 days.

(21) Appl. No.: 09/642,453

(22) Filed: Aug. 18, 2000

(51) Int. Cl.
*H04L 12/28* (2006.01)
*G01R 31/08* (2006.01)
*G06F 15/167* (2006.01)
*G06F 15/173* (2006.01)

(52) U.S. Cl. .............. 709/216; 709/203; 709/238; 370/390; 370/241; 379/27.03

(58) Field of Classification Search ............ 709/203, 709/204, 227, 216, 238; 370/468, 401, 352, 370/260, 261, 262, 270, 493, 494, 495, 328, 370/355, 356, 390, 240, 241, 351, 412; 704/222, 704/503, 230; 348/14.12, 14.11; 379/22.02, 379/27.03, 27.04
See application file for complete search history.

(56) References Cited

U.S. PATENT DOCUMENTS

| | | | |
|---|---|---|---|
| 6,175,856 B1 * | 1/2001 | Riddle | 709/204 |
| 6,240,070 B1 * | 5/2001 | Kozdon et al. | 370/260 |
| 6,356,545 B1 * | 3/2002 | Vargo et al. | 370/355 |
| 6,466,574 B1 * | 10/2002 | Fujisaki et al. | 370/356 |
| 6,487,603 B1 * | 11/2002 | Schuster et al. | 709/231 |
| 6,600,738 B1 * | 7/2003 | Alperovich et al. | 370/352 |
| 6,603,501 B1 * | 8/2003 | Parry et al. | 348/14.12 |
| 6,604,070 B1 * | 8/2003 | Gao et al. | 704/222 |

OTHER PUBLICATIONS

RTP payload for redundant audio data, 1997.*

\* cited by examiner

*Primary Examiner*—Hanh Nguyen (57) ABSTRACT

A method of communicating digitized speech from a transmitting forum participant comprises the step of receiving a data structure that includes said digitized speech. The data structure is analyzed to determine whether the digitized speech is redundantly represented in a plurality of forms in the data structure. A portion of the data structure is forwarded to a receiving forum participant, thereby communicating the digitized speech from the transmitting forum participant. In this method, when the digitized speech is redundantly represented in the data structure in a plurality of forms, the forwarding step includes a step of selecting one or more forms, based on a function, from the plurality of forms in the data structure. A representative function includes a determination whether the receiving participant is a paid subscriber.

16 Claims, 3 Drawing Sheets

SYSTEM AND METHOD FOR PROVIDING INTERNET BASED PHONE CONFERENCES USING MULTIPLE CODECS

BACKGROUND OF THE INVENTION

Exponential growth in high bandwidth Internet Protocol ("IP") compliant networks together with new techniques for digitizing analog speech has resulted in significant developments in the field of electronic voice over IP ("VoIP") communication. Using a common personal computer together with a modem, a user can create a forum in which the user chats with other users thru an IP network. Indeed, a number of vendors including major portal sites provide users with the opportunity to participate in forums.

Despite the promise of modem IP networks, there remain a number of limitations on the bandwidth available for VoIP communication. Uncompressed human speech inherently requires a large bandwidth, a problem that is compounded when multiple people are speaking at once. Various compression techniques have been introduced to address this issue. For example, the International Telecommunications Union ("ITU") has provided a series of standards for audio compression, known as G series codecs, within the widely adopted H.323 standard.

A codec is a method of compressing digitized voice signals to a compressed digital signal. Each codec compresses digitized voice signals using a particular compression method, such as algebraic-code-excited linear prediction ("ACELP"), multipulse-maximum likelihood quantization ("MP-MLQ"), and low-delay, code excited linear prediction ("LD-CELP"). The result of the operation of a given codec on digitized voice signals is a compressed digital signal produced at a transmitted bit rate that is characteristic of the particular codec. Typically, the transmitted bit rate is constant. For example, within the H.323 standard, the G.711 codec produces a digital signal at a bit rate of 64 kb/s whereas the G.729 codec produces digital signal at a bit rate of 8 kb/s.

Because a codec compresses digitized voice signals in a predetermined fashion, the quality of the signal produced after decompressing the compressed data is fairly constant and therefore susceptible to measurement. Typically, codecs are rated using a mean opinion score ("MOS") that ranges from one (poor) to five (excellent). While the use of a codec having a MOS of five is preferable, in practice, such a codec requires a tremendous amount of bandwidth. Thus, compromises are made and standard voice conferences hosted by Internet portal sites typically use a codec having a relatively low MOS.

Another shortcoming of standard VoIP platforms, such as those provided by Internet portals, is that they use a single type of codec regardless of the environment in which the VoIP conference is operating. A typical VoIP platform is limited to the use of a lower-speed digital codec, such as G.728 (16 kb/s) or G.729 (8 kb/s), which have low MOS scores. In fact, the standard VoIP configuration uses a lower-speed digital codec regardless of whether the client is connected by a high bandwidth connection to the network and regardless of network load. Thus, the client of a typical VoIP platform has no option other than to use a relatively low-speed poor quality codec to communicate digital signals to others in the network. This deficiency in the art will tend to become magnified over time, as a growing number of clients switch from the relatively low bandwidth connectivity of a modem to higher speed methods of communication, such as cable modems, ISDN lines, or even T1, T3, or STS-X services.

In view of the above background, it would be highly desirable to provide an improved VoIP environment that is capable of exploiting additional bandwidth capacity when such capacity is present in the VoIP environment.

SUMMARY OF THE INVENTION

The present invention provides a solution to the shortcomings found in prior art VoIP platforms. In this invention, a VoIP platform supports a plurality of codecs with a range of bit rates and MOS equivalent scores. Novel algorithms are used to determine which supported codec is selected to digitize voice data from each participant in a VoIP based forum. Such algorithms are dependent upon factors such as the number of people participating in the VoIP forum, the bandwidth of the connection between clients and a server, and whether clients are paid subscribers or simply gratuitous users. In one embodiment, voice data is transmitted from a client to a server in the VoIP platform in user datagram protocol (UDP) packets that comprise a packet header, a first data segment encoding a digital signal produced by a low resolution codec, and a second data segment encoding a digital signal produced by a high resolution codec. The server independently determines whether to send the high resolution or low resolution data segment present in each UDP packet based on a number of criteria, including whether recipient clients are paid or nonpaying subscribers. In this way, VoIP platforms in accordance with the present invention optimally exploit the bandwidth of a network environment so that codecs having an appropriate MOS score are selected for use during a VoIP based conference.

In a first aspect of the present invention provides a method of communicating digitized speech from a transmitting forum participant in a forum. In this method a data structure that includes digitized speech is received. The data structure is analyzed to determine whether the digitized speech is redundantly represented in a plurality of forms in the data structure. A portion of the data structure is forwarded to a receiving forum participant, thereby communicating the digitized speech from the transmitting forum participant. In this apsect of the invention, when the digitized speech is redundantly represented in the data structure in a plurality of forms, the forwarding step includes a step of selecting one or more forms from the plurality of forms in the data structure based on an aspect of the forum. Furthermore, the portion of the data structure that is forwarded to the receiving forum participant includes data in the data structure that corresponds to each of the selected one or more forms.

In some embodiments in accordance with the first aspect of the present invention, each form in the plurality of forms is characterized by an operation of a different codec on a voice signal that corresponds to the digitized speech from said transmitting forum participant. In additional embodiments in accordance with the first aspect of the present invention, each form in the plurality of forms is characterized by a different amount of a characteristic. Representative characteristics include a coding method, a transmitted bandwidth, a bit rate, a form of bit rate, a level of speech quality, an amount of error correction, a band signaling tone, a complexity, a frame size, an amount of delay, and a native sampling rate.

In additional embodiments in accordance with the first aspect of the invention, the digitized speech is redundantly represented in the data structure in a first form and a second form. The first form is determined by an operation of a first codec on a voice signal corresponding to the digitized speech. The second form determined by an operation of a second codec on the voice signal corresponding to the digitized speech. The first codec is characterized by a first predetermined transmitted bandwidth and the second codec is characterized by a different second predetermined transmitted bandwidth.

In yet other embodiments in accordance with the first aspect of the invention, the digitized speech is redundantly represented in the data structure in a first and second form. The first form is characterized by an operation of a first codec on a voice signal corresponding to the digitized speech and the second form is characterized by an operation of a second codec on the voice signal. Furthermore, the first codec operates with a first frame length and the second codec operates with a different second frame length. Therefore, the first form and the second form are typically represented in the data structure in unequal durational amounts.

In some embodiments aspect of the forum that is used to determine which codecs to use is a status of the receiving forum participant, a number of nonpaying participants in said forum or a number of paying participants in said forum. As used herein, the term status is broadly construed and includes the possession of one or more forum privileges, such as the privilege to speak or moderate a forum.

A second aspect of the present invention provides a method of communicating a voice signal from a participant in a forum. In this method, one or more codecs are selected based on an aspect of a forum. Then, by operation of each selected codec, an amount of voice the voice signal is converted to compressed digital data. The compressed digital data is packaged into a packet. Then the packet is transmitted, thereby communicating the voice signal from the forum participant. When more than one codec is selected, the compressed digital data includes redundant representations of the voice signal associated with the participant in the forum.

In some embodiments in accordance with the second aspect of the present invention, the selecting step includes a selection of a first and a second codec. Furthermore, the converting step includes a conversion of a first amount of the voice signal from the participant in the forum to a first quanta of compressed digital data having a first degree of a characteristic. The converting step also includes a conversion of a second amount of the voice signal from the participant in the forum to a second quanta of compressed digital data having a second degree of the same characteristic. In such embodiments, their exists an overlap between the first amount of the voice signal and the second amount of the voice signal.

In other embodiments in accordance with the second aspect of the invention, the characteristic is a coding method, a transmitted bandwidth, a bit rate, a form of bit rate, a level of speech quality, an amount of error correction, a band signaling tone, a complexity, a frame size, an amount of delay or a native sampling rate. Additionally, the aspect of the forum is a status of a participant in the forum, a number of nonpaying participants in the forum or a number of paying participants in the forum.

A third aspect of the present invention provides a computer product for use in conjunction with a computer system, the computer program product comprising a computer readable storage medium and a computer program mechanism embedded therein. The computer program mechanism comprises a receiving module for receiving a data structure that includes digitized speech from a transmitting forum participant in a forum. The computer program mechanism also comprises an analyzer module for analyzing the data structure to determine whether the digitized speech in the data structure is redundantly represented in a plurality of forms. The computer program mechanism further comprises a selection module for selecting one or more forms from the plurality of forms in the data structure when the digitized speech is redundantly represented in the data structure in the plurality of forms based on an aspect of the forum. Finally, the computer program mechanism includes a forwarding module for forwarding a portion of the data structure to a receiving forum participant, thereby communicating the digitized speech from the transmitting forum participant in the forum. In this aspect of the present invention, the portion of the data structure that is forwarded to the receiving forum participant by the forwarding module includes data in the data structure that corresponds to each of the one or more forms selected by the selection module when the digitized speech is redundantly represented in the data structure in the plurality of forms.

A fourth aspect of the present invention provides a computer product for use in conjunction with a computer system, the computer program product comprising a computer readable storage medium and a computer program mechanism embedded therein. The computer program mechanism comprises a number of modules. For example, the computer program mechanism comprises a module for selecting one or more codecs based on an aspect of a forum as well as a module for converting to compressed digital data, by operation of each of the selected codecs, a voice signal associated with a participant in a forum. Additionally, the computer program mechanism includes a module for packaging the compressed digital data into a packet and a module for transmitting the packet, thereby communicating digitized speech from the participant in the forum. In embodiments in accordance with this fourth aspect of the invention, when more than one codec is selected, the compressed digital data includes a redundant representation of the voice signal associated with the participant in the forum.

A fifth aspect of the present invention includes a computer readable memory used to direct a client/server system to function in a specified manner. Executable instructions are stored in the memory. The executable instructions comprise instructions to receive a data structure including digitized speech from a transmitting forum participant in a forum. Furthermore the executable instructions include instructions to analyze the data structure to determine whether the digitized speech in the data structure is redundantly represented in a plurality of forms. The memory further includes executable instructions to select one or more forms from the plurality of forms in the data structure when the digitized speech is redundantly represented in the data structure in the plurality of forms based on an aspect of the forum. Additionally, the memory includes instructions to forward a portion of the data structure to a reciewing forum participant, thereby communicating the digitized speech from the transmitting forum participant in the forum. In embodiments in accordance with the fifth aspect of the present invention, the portion of the data structure that is forwarded to the receiving forum participant by the instructions to forward includes data in the data structure that corresponds to each of the one or more forms selected by the instructions to select one or more forms when the digitized speech is redundantly represented in the data structure in the plurality of forms.

A sixth aspect of the present invention provides a computer readable memory used to direct a client/server system to function in a specified manner. In this aspect of the invention, the memory comprises executable instructions. The executable instructions includes instructions to select one or more codecs based on an aspect of a forum as well as instructions to convert to compressed digital data, by operation of each selected codec, a voice signal associated with a participant in the forum. The memory further includes instructions to package the digital data into a packet as well as instructions to transmit the packet, thereby communicating digitized speech from the participant in the forum. In embodiments in accordance with the sixth aspect of the invention, when more than one codec is selected, the digital data includes a redundant representation of the voice signal associated with the participant in the forum.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
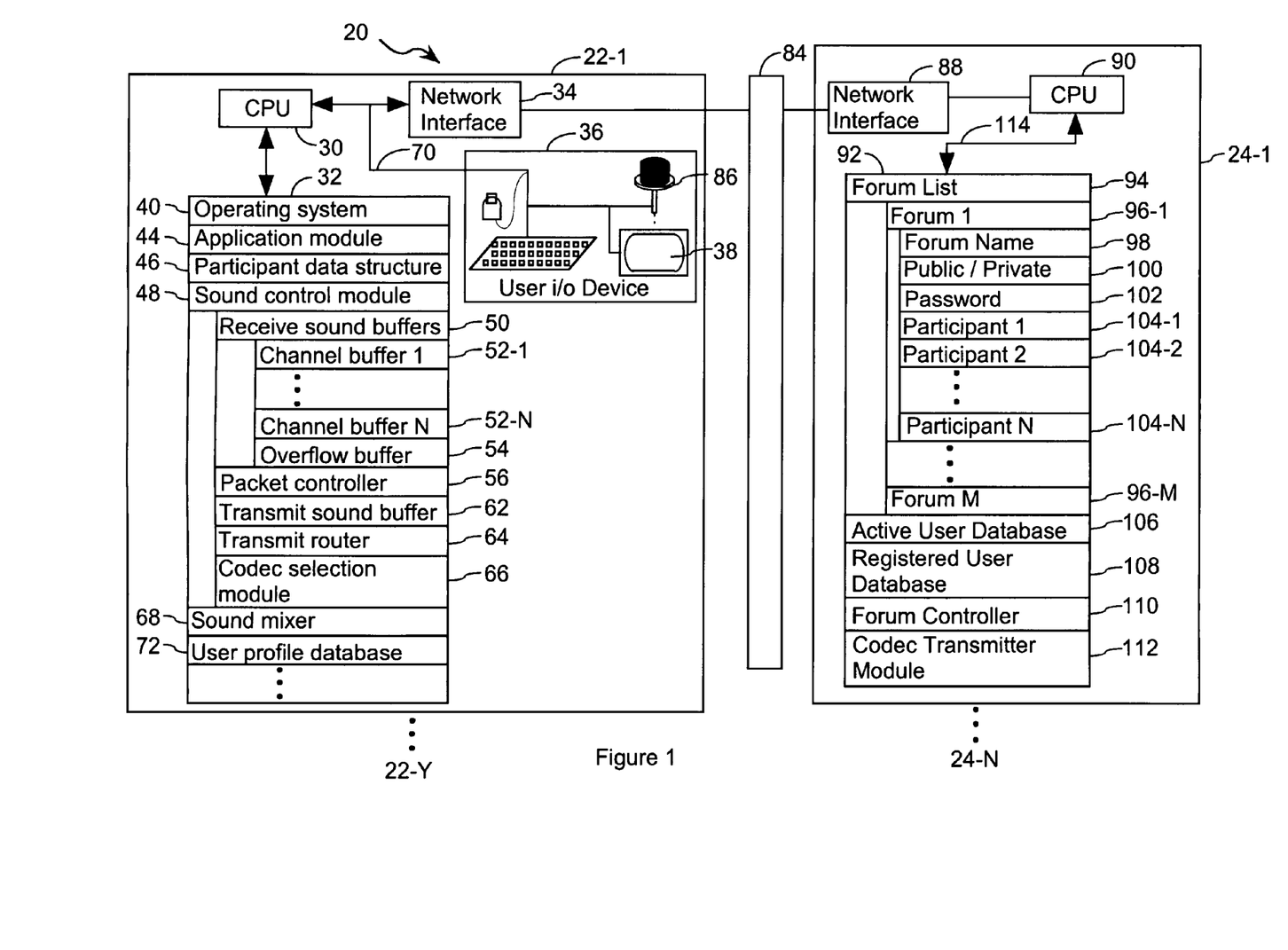
FIG. 1 illustrates a client/server computer topology in accordance with one embodiment of the present invention.

FIG. 1 illustrates a client/server computer apparatus 20 incorporating the technology of the present invention. Apparatus 20 includes a set of client computers 22-1 thru 22-Y that are each linked to a transmission channel 84. Transmission channel 84 generically refers to any wire or wireless link between computers. Client computers 22 use transmission channel 84 to communicate with a server computer 24-1, or other server computers designated by server computer 24-N, during multi-participant event such as a VoIP based forum. In some embodiments, the multi-participant event is regulated by a server computer 24.

Each client computer 22 has a standard computer configuration including a central processing unit (CPU) 30, network interface 34, and memory 32. Memory 32 stores a set of executable programs and sound buffers. Client computer 22 also includes input/output device 36. In a representative embodiment, input/output device 36 includes a microphone 86, a keyboard, a mouse, a display 38, and/or one or more speakers. CPU 30, memory 32, network interface 34 and input/output device 36 are connected by bus 70.

The executable programs in memory 32 include operating system 40, an application module 44 for providing a user interface to a multi-participant event such as a VoIP based forum, a participant data structure 46 for storing information about each participant in the multi-participant event, a sound control module 48, a sound mixer 68, and a user profile database 72. Sound control module 48 receives sound from remote participants through network interface 34 and transmits sound from the local participant, which is associated with client 22, to remote participants across transmission channel 84. Sound mixer 68 combines the sound of each participant in the multi-participant event into a combined signal that is ultimately routed to input/output device 36. In one embodiment, operating system 40 is capable of supporting multiple concurrent processes or threads. In another embodiment, operating system 40 is a WIN32 environment or an environment that provides functionality equivalent to WIN32. User profile database 72 stores a user profile that includes information associated with the user corresponding to client 22.

In a typical system 20 configuration, each client 22 is associated with a local user. At any given time, some of these users participate in a particular multi-participant event such as a VoIP based forum. Accordingly, each local participant uses input/output device 36 to communicate to remote participants in the multi-participant event via transmission channel 84. Sound control module 48 includes instructions for routing digitized speech from a local participant to remote receiving participants and for receiving digitized speech from remote participants. To receive digitized speech from remote participants, sound control module 48 includes a plurality of receive sound buffers 50. In the embodiment illustrated in FIG. 1, one of the receive sound buffers 50 is an overflow buffer 54 and each of the remaining receive sound buffers is a channel buffer 52. In a more specific embodiment, receive sound buffers 50 comprise four channel buffers 52 and one overflow buffer 54. Each of the channel buffers 52 is assigned to a particular remote participant.

Sound control module 48 further includes a packet controller 56 for determining the participant associated with a packet of sound received from a remote participant and for routing the packet to the appropriate receive sound buffer 50. Sound from the local participant is stored in a transmit sound buffer 62 and ultimately routed to the appropriate destination by transmit router 64. In one embodiment, transmit router 64 breaks the signal into discrete blocks. The discrete blocks are processed by codec selection module 66. Codec selection module 66 selects one or more codecs and uses the selected codecs to convert the discrete blocks to digital data. Then, transmit router 64 packages the digital data into a packet. When codec selection module 66 selects more than one codec, each selected codec independently converts the discrete blocks to digital data. Therefore, in such instances, the packets created by transmit router 64 include redundant digital representations of the discrete blocks of sound originating from the local participant. Each digital representation, or digital form, corresponds to the output of a particular codec selected by codec selection module 66.

The packaging of the digital data by transmit router 64 includes the process of creating a packet header. In one embodiment, this header includes routing information that directs the packet to server 24 via transmission channel 84. Server 24 then processes the packet and routes a portion of the digital data in the packet to all participants in the multi-participant event. It will be appreciated that one component of the packet header indicates how many redundant digital forms are present in the packet.

Server computer 24 includes standard server components, including a network interface 88, a CPU 90, and a memory (primary and/or secondary) 92. Memory 92 stores a set of computer programs and files to implement the processing associated with the invention. In particular, a forum list 94, an active user database 106, a forum controller 110, and a registered user database 108, are maintained in memory 92. Forum controller 110 controls forum list 94. Active user database 106 contains information about each participant that is logged into system 20. Registered user database 108 contains information about each user that is registered to use system 20, regardless of whether they are currently logged into system 20. In one embodiment, a registered user is any person who has been assigned a unique user identifier by forum controller 110 and has further designated a unique user label.

Forum list 94 comprises a list of multi-participant events 96, such as VoIP based forums, that are present in system 20. At least one user, associated with a user computer 22, participates in each forum 96. Thus, in this sense, at least one user computer 22 is associated with each forum 96. When a user computer 22 is associated with a forum, the user computer is capable of broadcasting audio, visual, and/or text messages to all other forum participants using the methods and apparatus of the present invention. When no user computer 22 is associated with a forum, the forum is terminated and removed from forum list 94 by forum controller 110.

In one embodiment, each forum 96 in forum list 94 includes information such as the name of the forum 98, an indicator 100 for determining whether the forum is public or private, a forum password 102, and the user identifier of each forum participant 104. Each participant in each forum is associated with a user computer 22 present in system 20.

When users participate in a particular multi-participant event, such as a VoIP based forum, digitized speech is routed from clients 22 through the forum controller 110 of server 24. Typically, the digitized speech is in the form of packets that are created by the transmit router 64, in conjunction with the codec selection module 66 associated with each client 22. In one embodiment, these packets are uniform datagram protocol (UDP) compliant. Such packets are received by server 24 and analyzed to determine whether they include redundant digital representations of analog speech. In one embodiment, this analysis is done by codec transmitter module 112 and is performed by querying a flag in each packet header that designates how many redundant forms of digital data are present in the packet. When redundant forms of digital data are present in the packet, codec transmitter module 112 determines which of these forms of digital data to transmit to recipient participants.

The general architecture and processing associated with the invention has now been disclosed. Attention presently turns to a more detailed consideration of the processing of the invention, together with the distinctions between these elements and advantages associated with the disclosed technology.

Figure 2:
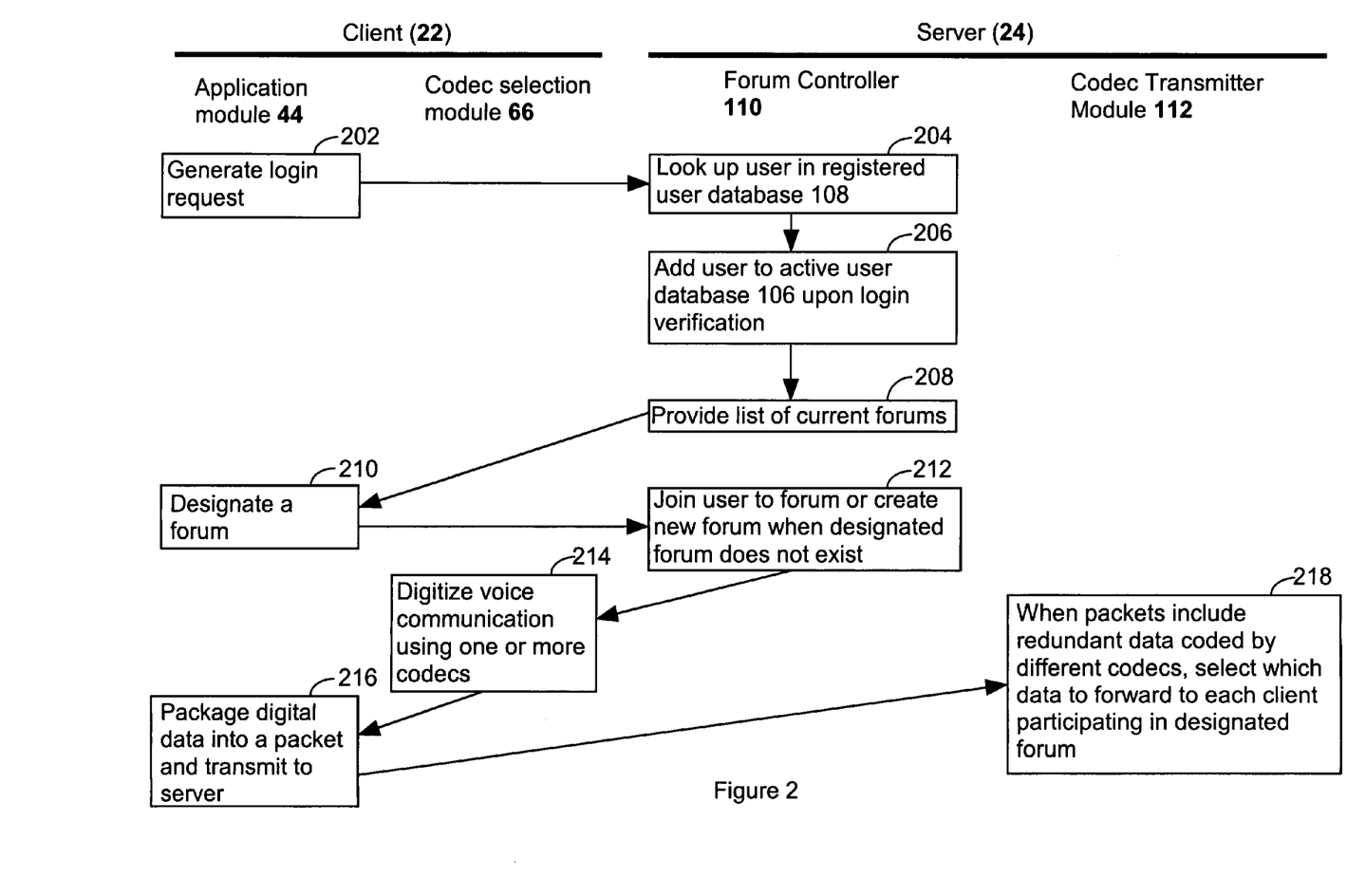
FIG. 2 illustrates the processing associated with the apparatus of FIG. 1 in accordance with one embodiment of the present invention.

FIG. 2 illustrates processing steps executed in accordance with one embodiment of the invention. In the first processing step shown in FIG. 2 (step 202), a user provides log in information necessary to log in to forum controller 110 (FIG. 1). In some embodiments, such log in information is a user identifier, a user label, a password, or any combination of such information. Once the user has provided the log in information, application module 44 accesses a profile corresponding to the user from user profile database 72 (FIG. 1). The log in information is combined with the profile information to generate a log in request that is transmitted to forum controller 110 on server 24 or other designated computers. In response to the login request, forum controller 110 verifies that the user is in registered user database 108 (step 204). Further, forum controller 110 adds the user to active user database 106 upon verification that the user is represented in registered user database 108 (step 206).

Once the user has logged in, forum controller 110 provides a portion of forum list 94 (step 208). Only forums 96 (FIG. 1) that are designated as public, however, are provided by forum controller 110 in processing step 208. In one embodiment, the portion of the forum list 94 provided in step 208 is determined by information stored in user profile database 72. Such functionality is advantageous because the profile information stored in user profile database 72 generally reflects the interests of the particular user. In alternative embodiments, information stored in registered user database 108 is used to determine what portion of forum list 94 to provide in step 208. For example, in some embodiments, registered user database 108 tracks the type of forums the user has accessed in the past and forum controller 110 uses such information to provide a subset of forum list 94 that is representative of the forums associated with the user in user database 108. In other embodiments, processing step 208 provides the entire list of forums available in forum list 94. In embodiments in which the entire forum list 94 is provided to application module 44, one or more filters within application module 44 filter forum list 94 based on one or more criteria. Such criteria are, for example, stored in the profile associated with the user in user profile database 72.

The portion of forum list 94 that is provided in processing step 208 is displayed on the user i/o device 38 of user computer 22, typically in a forums window. When the user selects a forum, application module 44 transmits this selection to forum controller 110 (step 210). In response, forum controller 110 joins the user to the selected forum 96 (step 212) or creates a new forum 96 when the forum designated in processing step 210 does not exist. Furthermore, forum controller 110 adds an entry 104 to the selected forum 96 thereby indicating that the user has joined the selected forum 96. If the forum 96 that the user selects is password protected, the user must first supply the correct password 102 before admittance to the forum. In one embodiment, forum participants are notified that the user has joined the selected forum 96 by use of a broadcast message sent to each application module 44 of each client computer 22 associated with a participant 104 in the designated forum 96.

Once a user has joined a forum 96, the user can communicate to other participants 104 in the forum. Microphone 86 in conjunction with transmit sound buffer 62 capture the analog speech of the forum participant. This speech is digitized and then compressed by codec selection module 66. An advantage of the present invention is that codec selection module 66 can use several different codecs to digitize the voice communications of the participant. Each codec that is used by codec selection module has one or more unique characteristics. Codec selection module matches the one or more unique characteristics associated with each codec to environmental conditions. Such environmental conditions include, but are not limited to, server 24 load, client 22/server 24 network bandwidth, whether the user associated with client 22 is a paying subscriber to a server 24 based service or a gratuitous user of server 24, a number of paying participants in the selected forum 96 and/or the a number of participants in the selected forum 96.

The one or more unique characteristics associated with a codec include the method used by the codec to compress digitized signals, a transmitted bandwidth, a bit rate, a form of bit rate, a level of speech quality, an amount of error correction, a band signaling tone, a complexity, and a frame size. Table 1 lists several representative codecs that are used in various embodiments of the present invention. As indicated by Table 1, there are many different methods used by codecs to compress digitized data such as digitized voice signals. The method used by a codec to compress digitized signals determines a number of the characteristics associated with a codec, such as the ability to handle a poor input signal, transmitted bit rate, channel number (mono or stereo), transmitted bandwidth, amount of error correction, presence of a band signaling tone, complexity, frame size, level of speech quality, and delay.

TABLE 1

Representative codecs used in some embodiments of codec selection module 66

| Codec | Bit rate kb/s | Coding method |
| --- | --- | --- |
| G.711 | 64 | pulse code modulation |
| G.723.1 | 5.3/6.3 | algebraic, code-excited linear predictive coding/multipulse, maximum-likelihood quantization |
| G.726 | 40, 32, 24, or 16 | adaptive differential pulse code modulation |
| G.728 | 16 | low-delay code-excited linear prediction |
| G.729 | 8 | constant-structure code-excited linear prediction |
| Abate | 32 | adaptive delta modulation |
| RPE-LTP | 13 | regular pulse-excited linear transform prediction |
| MRELP | 9.6 | upgraded form of code-excited linear prediction |
| SX9600 | 9.6 | upgraded form of code-excited linear prediction |
| VSELP | 8 | upgraded form of code-excited linear prediction |
| SX7000 | 7.3 | upgraded form of code-excited linear prediction |
| CELP | 4.8 | code-excited linear prediction |
| STC | 2.4–4.8 | linear predictive coding |
| QCELP | 1–4 | upgraded form of code-excited linear prediction |
| ACELP.wide | 12.8 | algebraic-code-excited linear prediction - wide |
| ACELP.net | 5–16 | algebraic-code-excited linear prediction - net |
| PureVoice (Qualcomm) | 4.7–13.3 | code-excited linear prediction |

The level of speech quality associated with each codec used by codec selection module 66 is subjective. Methods for determining the level of speech quality in the digital data produced by a codec are specified in International Telecommunications Union (ITU) recommendations ITU-T P.800 and P.830. Such methods include listening-opinion tests and conversation-opinion tests. For codecs having a bit rate of between 4 and 32 kbits/s, a common method for assessing the speech quality associated with a codec is the absolute category rating (ACR) that provides a mean opinion score (MOS) that range from 1 (very poor) to 5 (excellent). A MOS rating of 4 is known as toll quality, a category encompasses most long distance land based telephone calls. A standard codec, such as the H.323 G.711 codec, has a MOS score of 4.2.

One advantage of the present invention is the ability for codec selection module 66 (FIG. 1) to use a deterministic function to choose whether to compress the digitized voice signal from the transmitting user with a single codec or more than one codec. When more than one codec is selected by codec selection module 66, redundant digital forms of the digitized voice signal are produced. For example, in some embodiments of the present invention, codec selection module 66 selects a codec that requires an input signal that was produced by sampling an analog signal at a low sampling rate, such as 8 kHz, and an input signal that was produced by sampling an analog signal at a high sampling rate, such as 16 kHz. In such embodiments, the 8 kHz codec compresses the same digitized voice signal as the 16 kHz codec, thus producing redundant representations of the digitized voice signal. These redundant representations are packaged together by transmit router 64 into UDP packets. In other embodiments in accordance with this aspect of the invention, codec selection module 66 selects a high bandwidth codec that yields 20 millisecond digital frames and a low resolution codec that yields 36 millisecond digital frames. In such embodiments, when transmit router 64 uses a 90 millisecond UDP packet to package the digital data, four digital frames generated by the high bandwidth (20 millisecond) codec together with a 10 millisecond residue, and two digital frames of the low bandwidth (36 millisecond) codec, together with a 18 ms of residue, are packaged into a single UDP packet. A flag in the UDP header is then encoded to reflect the fact that the UDP packet has two redundant forms of digital data.

At this point, a number of unique attributes of the present invention will be appreciated by those skilled in the art. One attribute of the present invention is that a client 22 that is connected by a high bandwidth connection to a server 24 can specifically exploit the additional capacities of a network 20 (FIG. 1) by transmitting a corresponding high and low resolution digital signal to the server. When a server 24 receives such a redundant digital signal, the server 24 forwards the high resolution digital signal to selected participants in a multi-participant event, such as a VoIP based forum. Further, the server 24 sends the corresponding low resolution digital signal to remaining members of the multi-participant event. Such a configuration is advantageous in environments in which some of the participants in the multi-participant event are associated with a client 22 that is connected to server 24 by a low bandwidth connection while remaining participants in the multi-participant event are associated with clients 22 that are connected to a server 24 by a high bandwidth connection. Such configurations are also advantageous in mixed environments in which some of the participants to a multi-participant event are paying subscribers and some of the participants are nonpaying gratuitous users. In such embodiments, the paying subscribers receive the high resolution signal and the nonpaying users receive the low resolution signal.

It will be appreciated that numerous differing multi-codec configurations are possible and all such configurations are within the scope of the present invention. For example, in one embodiment, when the server receives a packet that includes two different forms of redundant digital data, both forms of digital data are sent to one class of participants in a multi-participant event whereas only one digital form is sent to another class of participants in the multi-participant event.

In one embodiment, codec selection module 66 chooses one or two codecs from the set of a low, medium, high and very high quality codec using the following scheme. In this scheme, a six bit index value is generated. The first bit of the index value, HBONLY, indicates whether the multi-participant event is exclusively populated by participants using clients 22 that are connected to a common server with broadband connections. The second thru fourth bit of the index value, collectively #Users, represent a nonpaying user counter. Accordingly, bits two thru four serve to track the number of users that are present in a multi-participant event. The #Users tracking mechanism is limited to an absolute value of seven. Thus, once there are more than seven users in a multi-participant event, the presence of additional users is not tracked by the counter #Users and therefore the presence of such additional users does not affect the codec selection process. Bit five of the index value, Pay_Exists, represents a paid subscriber flag. Accordingly, bit five serves to determine whether any participant in the multi-participant event is a paid subscriber. The final bit in the index value, HBUser, represents whether the transmitting client 22 is connected to a server 24 with a broadband connection. In one implementation in accordance with this scheme, the transmitting user is not tracked by the paid subscriber counter or nonpaid user counter.

The index value is used to make a codec selection using a transmit table. An example of this selection process is found in the following exemplary code. In this exemplary code, a function called ChooseCodec provides a transmit table. Each entry in the transmit table represents the choice of one or two codecs selected from the set of a low, medium, high, and very high quality codec.

```
(1)   Function: ChooseCodec( )
(2)   //
(3)   #define LOW_FLAG         (1<<0)
(4)   #define MEDIUM_FLAG      (1<<1)
(5)   #define HIGH_FLAG        (1<<2)
(6)   #define VERYHIGH_FLAG    (1<<3)
(7)   //
(8)   // Six bit index value: HBONLY|#Users|#Users|#Users|Pay_Exists|
      HB_User
(9)   //
(10)  #define USER_HB_FLAG       0x0001
(11)  #define RX_PAY_FLAG        0x0002
(12)  #define NUM_USERS_MASK     0x0007
(13)  #define NUM_USERS_SHIFT    2
(14)  #define HBONLY_FLAG        0x0020
(15)  #define LAST_FLAG          0x0040
(16)
(17)  //
(18)  // Codec definitions
(19)  #define LOWCODEC     SX20_INDEX    // SX20
(20)  #define LOWQUAL 2000
(21)  #define MEDIUMCODEC     PV_INDEX          // ACELPNET 5.8K
(22)  #define MEDIUMQUAL 5800
(23)  #define HIGHCODEC       ACELPW_INDEX    // ACELPWIDE 12.8K
(24)  #define HIGHQUAL 12800
(25)  #define VERYHIGHCODEC   ACELPW_INDEX    // ACELPWIDE 18.4K
(26)  #define VERYHIGHQUAL 18400
(27)  //
(28)  // The transmit table
(29)  static char TxMatrix[LAST_FLAG] = {
(30)  /* 0|0 users RX|no pay RX|user not HB *1 MEDIUM_FLAG,
(31)  /* 1|0 users RX|no pay RX|user is HB*/ MEDIUM_FLAG,
(32)  /* 2|0 users RX|yes pay RX|user not HB */ MEDIUM_FLAG,
(33)  /* 3|0 users RX|yes pay RX|user is HB */ MEDIUM_FLAG,
(34)  /* 4|1 users RX|no pay RX|user not HB */ MEDIUM_FLAG,
(35)  /* 5|1 users RX|no pay RX|user is HB */ MEDIUM_FLAG,
(36)  /* 6|1 users RX|yes pay RX|user not HB */ HIGH_FLAG,
(37)  /* 7|1 users RX|yes pay RX|user is HB */ HIGH_FLAG,
(38)  /* 8|2 users RX|no pay RX|user not HB */ MEDIUM_FLAG,
(39)  /* 9|2 users RX|no pay RX|user is HB */ MEDIUM_FLAG,
(40)  /* 10|2 users RX|yes pay RX|user not HB */ HIGH_FLAG
(41)  /* 11|2 users RX|yes pay RX|user is HB */ HIGH_FLAG
(42)  /* 12|3 users RX|no pay RX|user not HB */ MEDIUM_FLAG,
(43)  /* 13|3 users RX|no pay RX|user is HB */ MEDIUM_FLAG,
(44)  /* 14|3 users RX|yes pay RX|user not HB */ MEDIUM_FLAG|HIGH_FLAG,
(45)  /* 15|3 users RX|yes pay RX|user is HB */ MEDIUM_FLAG|HIGH_FLAG,
(46)  /* 16|4 users RX|no pay RX|user not HB */ LOW_FLAG,
(47)  /* 17|4 users RX|no pay RX|user is HB */ LOW_FLAG,
(48)  /* 18|4 users RX|yes pay RX|user not HB */ LOW_FLAG|MEDIUM_FLAG,
(49)  /* 19|4 users RX|yes pay RX|user is HB */ LOW_FLAG|HIGH_FLAG,
(50)  /* 20|5 users RX|no pay RX|user not HB */ LOW_FLAG,
(51)  /* 21|5 users RX|no pay RX|user is HB */ LOW_FLAG
(52)  /* 22|5 users RX|yes pay RX|user not HB */ LOW_FLAG|MEDIUM_FLAG,
(53)  /* 23|5 users RX|yes pay RX|user is HB */ LOW_FLAG|MEDIUM_FLAG,
(54)  /* 24|6 users RX|no pay RX|user not HB */ LOW_FLAG,
(55)  /* 25|6 users RX|no pay RX|user is HB */ LOW_FLAG,
(56)  /* 26|6 users RX|yes pay RX|user not HB */ LOW_FLAG|MEDIUM_FLAG,
(57)  /* 27|6 users RX|yes pay RX|user is HB */ LOW_FLAG|MEDIUM_FLAG,
(58)  /* 28|7 users RX|no pay RX|user not HB */ LOW_FLAG,
(59)  /* 29|7 users RX|no pay RX|user is HB */ LOW_FLAG
(60)  /* 30|7 users RX|yes pay RX|user not HB */ LOW_FLAG|MEDIUM_FLAG,
(61)  /* 31|7 users RX|yes pay RX|user is HB */ LOW_FLAG|MEDIUM_FLAG,
(62)  // Remaining combinations within the six bit word are not used
(63)  //end function ChooseCodec( )
```

Lines 3 thru 6 of function ChooseCodec( ) serve as codec selection flags. These flags are used, often in combination, to select particular codecs once a particular codec selection has been designated by the transmit table (lines 29 thru 62). Lines 10 thru 15 of function ChooseCodec( ) define the six bit number that is used to look up a codec combination in the transmit table. Lines 18 thru 26 define the low, medium, high, and very high quality codecs in the set of codecs that is used in this example. Lines 28 thru 61 define the transmit table. More specifically, line 29 of function ChooseCodec( ) defines an array called TxMatrix. The array TxMatrix provides a codec selection from the set of low, medium, high, and very high quality codecs for each of the values in the 6 bit index value defined in lines 10 thru 15. The utility of array TxMatrix is best introduced by the following detailed examples.

In the first example, the six bit index value used to look up a value in TxMatrix has the value zero. This represents the case in which there are no users besides the transmitting user, there are no users that paid for the privilege to use server 24 and the transmitting user is not connected by a high bandwidth connection to server 24. In such instances, line 30 of the transmit table selects the medium codec flag. The medium codec flag, in turn, selects the medium codec defined on line 21, i.e. the codec ACELPNET 5.8 k. Thus, line 30 represents a case, or set of environmental conditions, in which the codec selection module selects a single codec to compress digitized voice signals of the transmitting event participant.

The second example describes the functionality of line 48 of the illustrative code, which represents a situation in which the array TxMatrix selects two codecs. Line 48 represents the case where the index value has a value of 18. The six bit index value is 18 when there are four participants in the forum, the transmitting participant is a paid subscriber and the transmitting participant is not connected by a high bandwidth connection. In such instances, the transmit table designates the selection of the flag LOW_FLAG and MEDIUM_FLAG (line 48). These flags are combined by an or function, thereby selecting the low resolution codec (SX20) and the medium resolution codec (ACELPNET 5.8 k). Thus, when the six bit index value is 18, codec selection module 66 independently compresses voice signals of the transmitting user to a compressed digital form using both the SX20 and ACELPNET 5.8 k codecs. The digital frames produced by operation of the SX20 and ACELPNET 5.8 k codecs on the voice signal are then placed in independent data segments in a common UDP packet by transmit router (64). It will be appreciated that when codecs having differing frame lengths are chosen, the durational amount of data generated by each codec used by codec selection module 66 that is packaged into a single UDP packet varies. However, because UDP packets are buffered by the receiving client, it is expected that this variance will not produce noticeable delay in the sound transmitted during a multi-participant event.

The following code shows how a six bit index value is generated and used to perform a table lookup using the previously described matrix TxMatrix. Once the table lookup is performed, the codecs to be used by codec selection module 66 are selected.

```
(64)    boot FtVoiceService::ChooseCodec( )
(65)    boot stat = false;
(66)    intflags = 0;
(67)    int num_users = 0;
(68)    // Get number of users
(69)    if ( m_InConference )
(70)    {
(71)        if ( m_UserCount ) num users = m_UserCount – 1;
(72)    }
(73)    else
(74)    {
(75)        // In forum
(76)        if( m_TalkCtrl )  {
(77)            // If conference or non-mike controlled forum
(78)            num_users = m_MikeCount;
(79)        }
(80)        else   {
(81)            num_users = m_UserCount;
(82)        }
(83)    }
(84)    // sanity check
(85)    assert(num_users >= 0);
(86)    // Cap this number to 7
(87)    //
(88)    num_users &= NUM_USERS_MASK;
(89)    // Set the flags
(90)    if ( m_Broadband ) flags |= USER_HB_FLAG;
(91)    // Set pay flag if we are transmitting to anyone other than ourselves who are pay
(92)    // users; if we're paying and user count is 1, we're in mike reflector, so we'd like to
(93)    // send HB
(94)    if( m_Paying )
(95)    {
(96)        if( m_PayingCount >= 2||m_UserCount == 1) flags |= RX_PAY_FLAG;
(97)    }
(98)    else if ( m_PayingCount ) {
(99)        flags |= RX_PAY_FLAG;
(100)   }
(101)   flags |= (num_users <<NUM_USERS_SHIFT);
(102)   assert(flags >= 0 && flags < LAST_FLAG);
```

```
(103)  int codec_flags = TxMatrix[flags];
(104)
(105)  /* Trap for "impossible" cases */ assert(codec_flags != 0);
(106)
(107)  // Set the codec or codecs
(108)  switch( codec_flags )
(109)  {
(110)  case LOW_FLAG:
(111)       stat = m_Audio->setCodec(LOWCODEC, LOWQUAL);
(112)       break;
(113)  case MEDIUM_FLAG:
(114)       stat = m_Audio->setCodec(MEDIUMCODEC, MEDIUMQUAL);
(115)       break;
(116)  case HIGH_FLAG:
(117)       stat = m_Audio->setCodec(HIGHCODEC, HIGHQUAL);
(118)       break;
(119)  case VERYHIGH_FLAG:
(120)       stat = m_Audio->setCodec(VERYHIGHCODEC, VERYHIGHQUAL);
(121)       break;
(122)  case LOW_FLAG|MEDIUM_FLAG:
(123)       stat = m_Audio->setCodec(LOWCODEC, LOWQUAL,
(124)            MEDIUMCODEC, MEDIUMQUAL);
(126)       break;
(127)       case MEDIUM_FLAG|HIGH_FLAG:
(128)       stat = m_Audio->setCodec(MEDIUMCODEC, MEDIUMQUAL,
(129)            HIGHCODEC, HIGHQUAL);
(130)       break;
(131)       default:
(132)       assert(0);
(133)  } /* switch */
(134)  m_CodecFlags = codec_flags;
(135)  return stat;
(136) }
```

Lines 68 thru 83 determine the number of users who are paying or are gratuitous users in a particular multi-participant event. Lines 84 thru 106 set the flags that compose the six bit index value that describes the environment of a particular multi-participant event. Upon execution of line 102, the variable "flags" fully represents the six bit index value. On line 103, a table lookup into TxMatrix is performed in order to determine which codecs are to be used by codec selection module 66. The results of the table lookup are assigned to the variable "codec_flags" (line 103). Line 105 assigns a default value to commercially undesirable scenarios. Finally, lines 107 thru 135 provide a switch that includes each of the possible codec choices to be used by codec selection module 66 in this embodiment. Accordingly, the operation of the TxMatrix table lookup provides six different codec choices LOW_FLAG (lines 110 thru 112), MEDIUM_FLAG (lines 113 thru 115), HIGH_FLAG (lines 116 thru 118), VERYHIGH_FLAG (lines 119 thru 121), LOW_FLAG in combination with MEDIUM_FLAG (lines 122 thru 126) and MEDIUM_FLAG in combination with HIGH_FLAG (lines 127 thru 130). Furthermore, the switch provides a default setting for undefined cases (lines 131–132).

At this point, one skilled in the art will appreciate the numerous advantages of the present invention. By using a dynamic codec selection algorithm, a multi-participant event is crafted to take advantage of the specific environmental conditions of the network at the time of the event. This advantage is particularly evident in multi-participant events in which some of the participants are connected by a high bandwidth connection to a network while other users are connected by a low bandwidth connection. In such situations, the technology of the present invention prevents the "lowest common denominator" problem that arises in prior art systems. Thus, users connected to a network by a high bandwidth connection enjoy the benefits of a high quality codec while the low bandwidth users receive digital sound coded by a lower resolution codec. Another advantage of the present invention is that it supports business models in which users are granted free access to multi-participant events before paying for upgrades in voice quality. Such business models are advantageous because they encourage potential users to invest time learning how to use multi-participant events before any payment is required. Implementation of codec selection module 66 provides additional advantages. For example, in an international setting, codecs optimized for specific languages, such as German or English, can be used by codec selection module 66 when it is determined that the multi-participant language is being spoken in such a language. Thus, codecs that are uniquely adapted to optimize the type of sound transmitted during the multi-participant event can be selected by codec selection module 66.

Figure 3A:
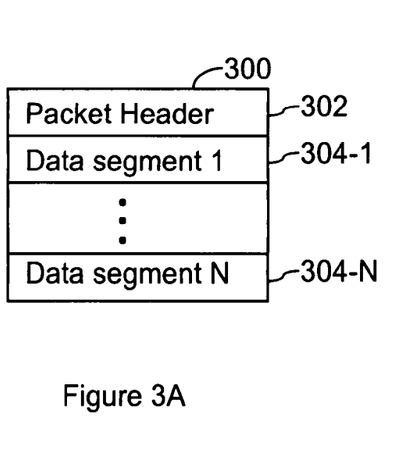
FIGS. 3A, 3B and 3C illustrate UDP packets in accordance with various embodiments of the present invention.
Figure 3B:
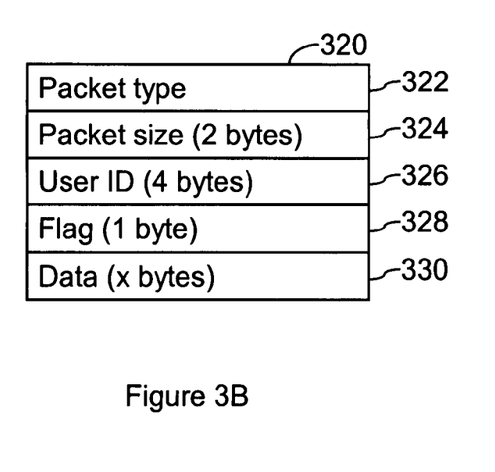
Figure 3C:
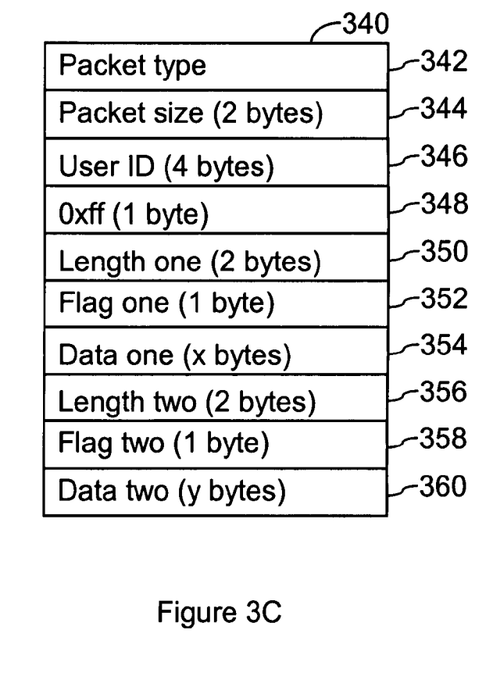

Referring to FIG. 3, several different UDP packets in accordance with the present invention are shown. FIG. 3A shows a general format for a UDP packet 300 that includes the compressed digital output of multiple codecs. Packet 300 includes a packet header 302 and data segments 304-1 thru 304-N. Each data segment 304 includes the compressed digital output associated with a particular codec used by codec selection module 66 (FIG. 1). Packet 320 describes a UDP packet that is generated by transmit router 64 (FIG. 1) when codec selection module 66 chooses a single type of codec for compressing digitized voice signals. Packet 320 includes packet type flag 322 for uniquely identifying UDP packet type, packet size 324 for recording the size of packet 320, user identifier 326 that uniquely identifies the transmitting participant associated with packet 320, flag 328 and data segment 330 for storing a durational amount of digital output from a codec used by codec selection module 66.

Types of UDP packets that are designated by packet type flag 322 include UDP packets that have audio information, UDP packets that include a user identifier command, and UDP packets that identify the application 44 module version associated with the transmitting client 22.

Packet 340 is a representative UDP packet that is generated by transmit router 64 when codec selection module 66 chooses two codecs. For example, UDP packet 340 is used when TxMatrix returns a request for LOW_FLAG|MEDIUM_FLAG as provided in lines 122 thru 126 of the illustrative code and when the flags MEDIUM_FLAG|HIGH_FLAG (lines 127–130) are requested. Packet 340 includes a packet type flag 342 that is similar to packet type flag 322, packet size 344 for recording the size of the packet, a user identifier 346 that uniquely identifies the transmitting participant associated with packet 340, a one byte flag 348 that is set to the value 0xff to signify that the packet includes the digitized output of two independent codecs, the length 350 and flag 352 associated with a first data segment 354, and the length 356 and flag 358 associated with a second data segment 360.

Flag 328 in packet 320 (FIG. 3B) and flags 352 and 358 in packet 340 (FIG. 3C) identify the codec used to digitize the analog speech associated with a transmitting participant. In one embodiment, the flag is a one byte word in which four bits serve as a codec identifier (0 to 15), two bits provide sequence data to detect and prevent packet loss, and two bits serve as a flag to mark start_of_stream, end_of_stream, and audio_data.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as suited to the particular use contemplated. It is intended that the scope of the invention be defined by the following claims and their equivalents.

We claim:

1. A computer product for use in conjunction with a computer system, the computer product comprising a computer readable storage medium and a computer program mechanism embedded therein, the computer program mechanism comprising:
   a receiving module for receiving a data structure that includes digitized speech from a transmitting forum participant in a forum;
   an analyzer module for analyzing said data structure to determine whether said digitized speech in said data structure is redundantly represented in a plurality of forms;
   a selection module for selecting one or more forms from said plurality of forms in said data structure when said digitized speech is redundantly represented in said data structure in said plurality of forms based on an aspect of said forum;
   a forwarding module for forwarding a portion of said data structure to a receiving forum participant, thereby communicating said digitized speech from said transmitting forum participant in said forum;
   said portion of said data structure that is forwarded to said receiving forum participant by said forwarding module includes data in said data structure that corresponds to each of said one or more forms selected by said selection module when said digitized speech is redundantly represented in said data structure in said plurality of forms.

2. The computer product of claim 1, wherein each form in said plurality of forms is characterized by an operation of a different codec on a voice signal that corresponds to said digitized speech from said transmitting forum participant.

3. The computer product of claim 1, wherein each form in said plurality of forms is characterized by a different amount of a characteristic, said characteristic selected from the group consisting of a coding method, a transmitted bandwidth, a bit rate, a form of bit rate, a level of speech quality, an amount of error correction, a band signaling tone, a complexity, a frame size, an amount of delay, and a native sampling rate.

4. The computer product of claim 1, wherein said digitized speech is redundantly represented in said data structure in a first form and a second form,
   said first form determined by an operation of a first codec on a voice signal corresponding to said digitized speech;
   said second form determined by an operation of a second codec on said voice signal corresponding to said digitized speech;
   said first codec characterized by a first predetermined transmitted bandwidth; and
   said second codec characterized by a different second predetermined transmitted bandwidth.

5. The computer product of claim 1, wherein said digitized speech is redundantly represented in said data structure in a first and second form, said first form characterized by an operation of a first codec on a voice signal corresponding to said digitized speech and said second form characterized by an operation of a second codec on said voice signal corresponding to said digitized speech, wherein
   said first codec operates with a first frame length and said second codec operates with a different second frame length,
   said first form and said second form represented in said data structure in unequal durational amounts.

6. The computer product of claim 1, wherein said aspect is a status of said receiving forum participant, a number of nonpaying participants in said forum or a number of paying participants in said forum.

7. A computer readable memory used to direct a client/server system to function in a specified manner, comprising:
   executable instructions stored in said memory, said executable instructions including:
   instructions to receive a data structure that includes digitized speech from a transmitting forum participant in a forum;
   instructions to analyze said data structure to determine whether said digitized speech in said data structure is redundantly represented in a plurality of forms;
   instructions to select one or more forms from said plurality of forms in said data structure when said digitized speech is redundantly represented in said data structure in said plurality of forms based on an aspect of said forum;
   instructions to forward a portion of said data structure to a recieving forum participant, thereby communicating said digitized speech from said transmitting forum participant in said forum;
   said portion of said data structure that is forwarded to said receiving forum participant by said instructions to forward includes data in said data structure that corresponds to each of said one or more forms selected by said instructions to select one or more forms when said digitized speech is redundantly represented in said data structure in said plurality of forms.

8. The computer readable memory of claim 7, wherein each form in said plurality of forms is characterized by an operation of a different codec on a voice signal that corresponds to said digitized speech from said transmitting forum participant.

9. The computer readable memory of claim 7, wherein each form in said plurality of forms is characterized by a different amount of a characteristic, said characteristic selected from the group consisting of a transmitted bandwidth, a bitrate, a form of bitrate, a level of speech quality, an amount of error correction, a band signaling tone, a complexity, a frame size, an amount of delay, and a native sampling rate.

10. The computer readable memory of claim 7, wherein said digitized speech is redundantly represented in said data structure in a first form and a second form, said first form determined by an operation of a first codec on a voice signal corresponding to said digitized speech;

said second form determined by an operation of a second codec on said voice signal corresponding to said digitized speech;

said first codec characterized by a first predetermined transmitted bandwidth; and said second codec characterized by a different second predetermined transmitted bandwidth.

11. The computer readable memory of claim 7, wherein said digitized speech is redundantly represented in said data structure in a first and second form, said first form characterized by an operation of a first codec on an voice signal corresponding to said digitized speech and said second form characterized by an operation of a second codec on said voice signal corresponding to said digitized speech, said first codec operates with a first frame length and said second codec operates with a different second frame length; and said first form and said second form represented in said data structure in unequal durational amounts.

12. The computer readable memory of claim 7, wherein said aspect of said forum is a status of said receiving forum participant, a number of nonpaying participants in said forum, or a number of paying participants in said forum.

13. A computer readable memory used to direct a client/server system to function in a specified manner, comprising:

executable instructions stored in said memory, said executable instructions including:

first instructions to select one or more codecs based on an aspect of a forum;

instructions to convert to compressed digital data, by operation of each said selected codec, a voice signal associated with a participant in said forum;

instructions to package said digital data into a packet; and instructions to transmit said packet, thereby communicating digitized speech from said participant in said forum;

when more than one codec is selected, said digital data includes a redundant representation of said voice signal associated with said participant in said forum.

14. The computer readable memory of claim 13 wherein said first instructions choose a first and a second codec; and said instructions to convert to compressed digital data include:

instructions to convert a first amount of said voice signal associated with said participant in said forum to a first quanta of compressed digital data having a first degree of a characteristic;

instructions to convert a second amount of said voice signal associated with said participant in said forum to a second quanta of compressed digital data having a second degree of said characteristic;

said first amount of said voice signal overlapping at least in part said second amount of said voice signal.

15. The computer readable memory of claim 13, said characteristic is a transmitted bandwidth, a bit rate, a form of bit rate, a level of speech quality, an amount of error correction, a band signaling tone, a complexity, a frame size, an amount of delay, or a native sampling rate.

16. The computer readable memory of claim 13, said aspect of said forum is a status of a participant in said forum, a number of nonpaying participants in said forum, or a number of paying participants in said forum.

* * * * *